United States Patent
Chambers et al.

(10) Patent No.: US 7,636,425 B2
(45) Date of Patent: Dec. 22, 2009

(54) VOICE AUTHENTICATION FOR CALL CONTROL

(75) Inventors: Michael D. Chambers, Plainfield, IL (US); Cynthia K. Florkey, Chicago, IL (US); Ruth S. Gayde, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 631 days.

(21) Appl. No.: 11/132,043

(22) Filed: May 18, 2005

(65) Prior Publication Data
US 2006/0262908 A1 Nov. 23, 2006

(51) Int. Cl.
*H04M 1/64* (2006.01)

(52) U.S. Cl. .............. 379/88.02; 379/114.01; 379/145

(58) Field of Classification Search ......... 379/88.01, 379/88.02
See application file for complete search history.

(56) References Cited

U.S. PATENT DOCUMENTS

| | | | |
|---|---|---|---|
| 5,623,539 A * | 4/1997 | Bassenyemukasa et al. | 379/88.02 |
| 6,185,536 B1 * | 2/2001 | Haber et al. | 704/273 |
| 6,925,154 B2 * | 8/2005 | Gao et al. | 379/88.03 |
| 7,003,466 B2 * | 2/2006 | Brown et al. | 704/275 |
| 7,035,386 B1 * | 4/2006 | Susen et al. | 379/93.02 |

* cited by examiner

*Primary Examiner*—Simon Sing
(74) *Attorney, Agent, or Firm*—Duft, Bornsen & Fishman, LLP

(57) ABSTRACT

A communication network is disclosed that uses voice authentication to provide call control. The communication network includes a call control function, a voice collection system, a voice authentication system, and a permission system. The voice collection system collects voice samples of a first party during the call to a second party, and transmits the collected voice samples to the voice authentication system. The voice authentication system compares the collected voice samples to stored voice samples to determine the identity of the first party. The permission system determines whether the first party is authorized for the call based on the identity of the first party. The permission system generates results based on the determination and transmits the results to the call control function. The call control function then processes the results, and interrupts the call if the first party is not authorized.

16 Claims, 8 Drawing Sheets

VOICE AUTHENTICATION FOR CALL CONTROL

BACKGROUND OF THE INVENTION

1. Field of the Invention

The invention is related to the field of communication networks and, in particular, to voice authentication of a party to a call and providing call control based on the voice authentication.

2. Statement of the Problem

Telephone service and other associated services may be restricted to selected callers or may be tracked based on a particular caller. For instance, long distance calls may be restricted to selected callers, and the callers need to enter a Personal Identification Number (PIN), an access code, etc, to make a long distance call. Also, long distance calls may be tracked for billing purposes, and the callers need to enter a PIN, an access code, etc, associated with the caller that allows the long distance call to be tracked to that caller. In either case, the caller enters information thought to be unique to the caller, such as the PIN, the access code, etc. Unfortunately, this information is not secure as anyone knowing the PIN or the access code can represent themselves as the proper caller. The forging caller can then access telephony services and other services for which they are not authorized.

Another issue is verifying the identity of parties to a call over a telephone network, especially when confidential information is involved. Increased commerce is being conducted over telephone networks, which typically involves confidential information such as account numbers, credit card numbers, etc. Current methods of verifying the identity of a caller is to ask the caller for information thought to be unique to the caller, such as a private code, a mother's maiden name, a PIN, etc. Unfortunately, this information is not secure as anyone knowing the private code, the mother's maiden name, or the PIN of the caller can represent themselves as an authorized caller.

One solution to the security problems is to verify the identity of a caller based on their voice. Assume that Company X handles accounts for multiple people over the phone. To implement the voice verification, Company X would obtain voice samples from each of the account holders and store the voice samples in a voice authentication system. The voice authentication system includes a database that stores the voice samples of the account holders. The voice authentication system may convert the voice samples into voice prints, which are characteristics that are unique to a voice. Assume that a caller subsequently places a call to Company X to access an account, such as to purchase a product. A call center for Company X receives the call and instructs the caller to speak certain words or phrases. The call center collects voice samples from the caller, and transmits the voice samples to the voice authentication system for analysis. The voice authentication system compares the collected voice samples to stored voice samples to verify the identity of the caller. If the identity of the caller is verified, then Company X allows the caller access to his/her account. If the identity of the caller is not verified, then Company X will deny the caller access to the account.

One problem with the voice authentication process as described above is that it is an active process. The call center has to instruct the caller to speak words or phrases in order to collect voice samples. This can be inefficient and annoying for the caller. Another problem is that voice authentication has not been effectively implemented in communication networks, such as telephone networks, for the purpose of call control in the communication network.

SUMMARY OF THE INVENTION

The invention solves the above and other related problems using voice authentication to provide call control for calls over a communication network. According to the invention, voice samples of a caller are collected during the call. The voice samples are then processed to determine the identity of the caller. If the caller as identified is authorized for the call, then the call is allowed to continue. If the caller is not authorized, then the call is interrupted. For instance, the call may be tom down, or redirected to a customer care center, account manager, etc, for subsequent processing, such as investigating this apparent attempt to gain fraudulent access to the network or user data.

The invention advantageously provides a secure way of identifying a party to a call to effectively implement call restriction and call barring in the communication network. Voice is an attribute that is difficult to forge, and provides added security as compared to PINs and access codes. The invention also collects the voice samples of the caller in a passive manner so that the caller is unaware that voice authentication is taking place. Callers are therefore not bothered with a prompt from the communication network to speak a particular word or phrase. Callers also do not know when the voice authentication is taking place, which makes it more difficult to avoid or fool the voice authentication process. The invention also allows records to be generated that indicate who has made unauthorized calls.

In one embodiment of the invention, the communication network includes a call control function, a voice collection system, a voice authentication system, a permission system, and a billing system. Assume that the communication network is connecting an active call between a first party and a second party. The voice collection system collects voice samples of the first party during the call, and transmits the collected voice samples to the voice authentication system. The voice authentication system compares the collected voice samples to stored voice samples to determine the identity of the first party. The first party has previously stored voice samples in the voice authentication system. The voice authentication system then transmits the identity of the first party to the permission system. The permission system determines whether the first party is authorized for the call based on the identity of the first party. The permission system then generates results based on the determination and transmits the results to the call control function. The call control function processes the results. If the first party is authorized for the call, then the call control function allows the call to continue. If the first party is not authorized for the call, then the call control function interrupts the call, such as by initiating call tear down or redirecting the call.

The call control function may also generate a call record indicating that the call was unauthorized and indicating the identity of the first party making the unauthorized call. The call control function may then transmit the call record to the billing system. The billing system receives the call record and generates a bill based on the call record indicating that an unauthorized call was made and indicating the identity of the first party making the unauthorized call.

The invention may include other exemplary embodiments described below.

DESCRIPTION OF THE DRAWINGS

The same reference number represents the same element on all drawings.

DETAILED DESCRIPTION OF THE INVENTION

FIGS. 1-10 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
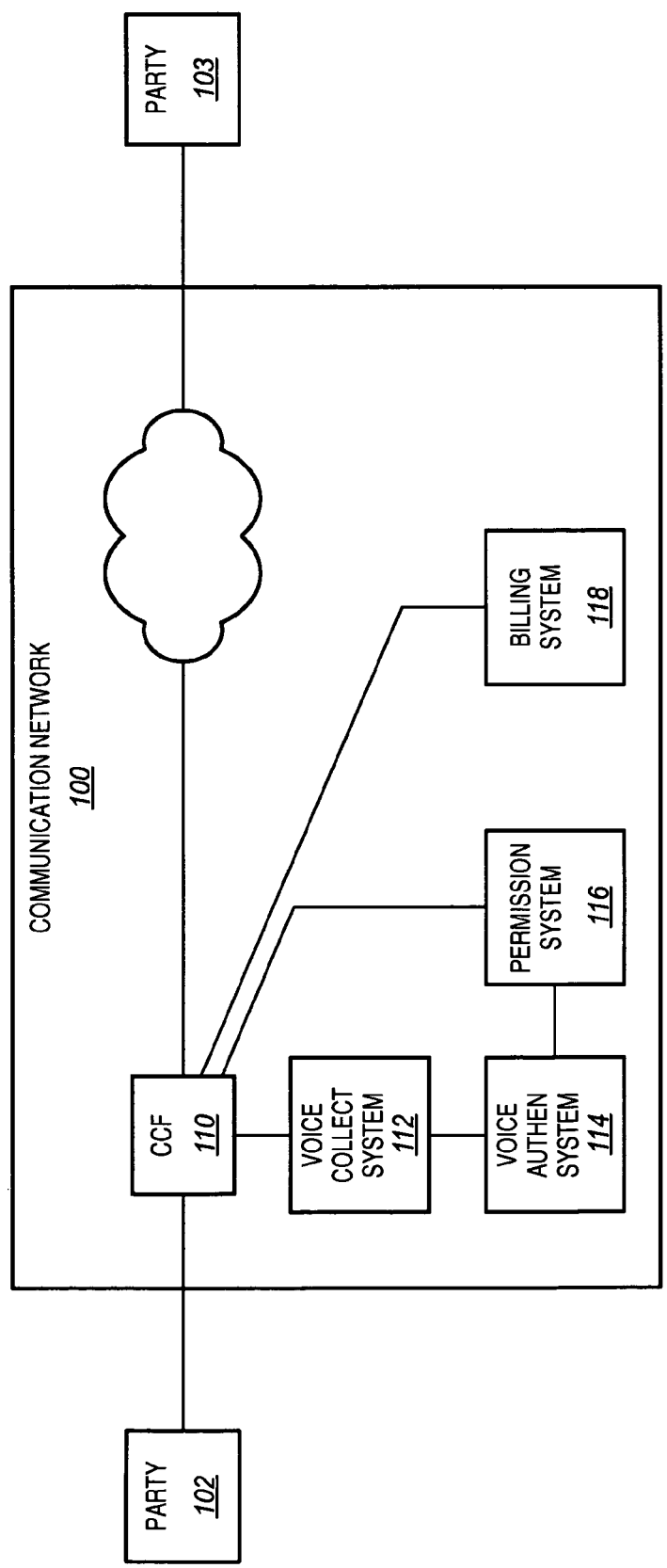
FIG. 1 illustrates a communication network in an exemplary embodiment of the invention.

FIG. 1 illustrates a communication network 100 in an exemplary embodiment of the invention. Communication network 100 includes a call control function (CCF) 110, a voice collection system 112, a voice authentication system 114, a permission system 116, and a billing system 118. Call control function 110 is operable to establish, monitor, and tear down or redirect calls. Assume for this embodiment that an active call is established between a first party 102 and a second party 103, and call control function 110 is monitoring the call. An active call comprises an established call over which a conversation is taking place. Call control function 110 may be any call control function in communication network 100. Communication network 100 may include other networks, systems, or devices not shown in FIG. 1.

Voice collection system 112 communicates with call control function 110. Voice collection system 112 may comprise a software application running on the same platform as the call control function 110 or on a different platform. Alternatively, voice collection system 112 may comprise a standalone processing system that communicates with call control function 110. Voice authentication system 114 may comprise a processing system and one or more databases. The processing system may be comprised of a single processor or many parallel processors. The databases may be resident on a single computer or server, or may be distributed among multiple computers or servers in communication network 100. Permission system 116 may have a similar configuration as the voice authentication system 114. Billing system 118 comprises any system or server that receives call records, such as call detail records, and generates customer bills based on the call records.

The make-up of communication network 100 can take on any desired form. Communication network 100 may comprise a wireless network, a wireline network, a circuit-based network, a packet-based network, or any other desired network or combination thereof.

Figure 2:
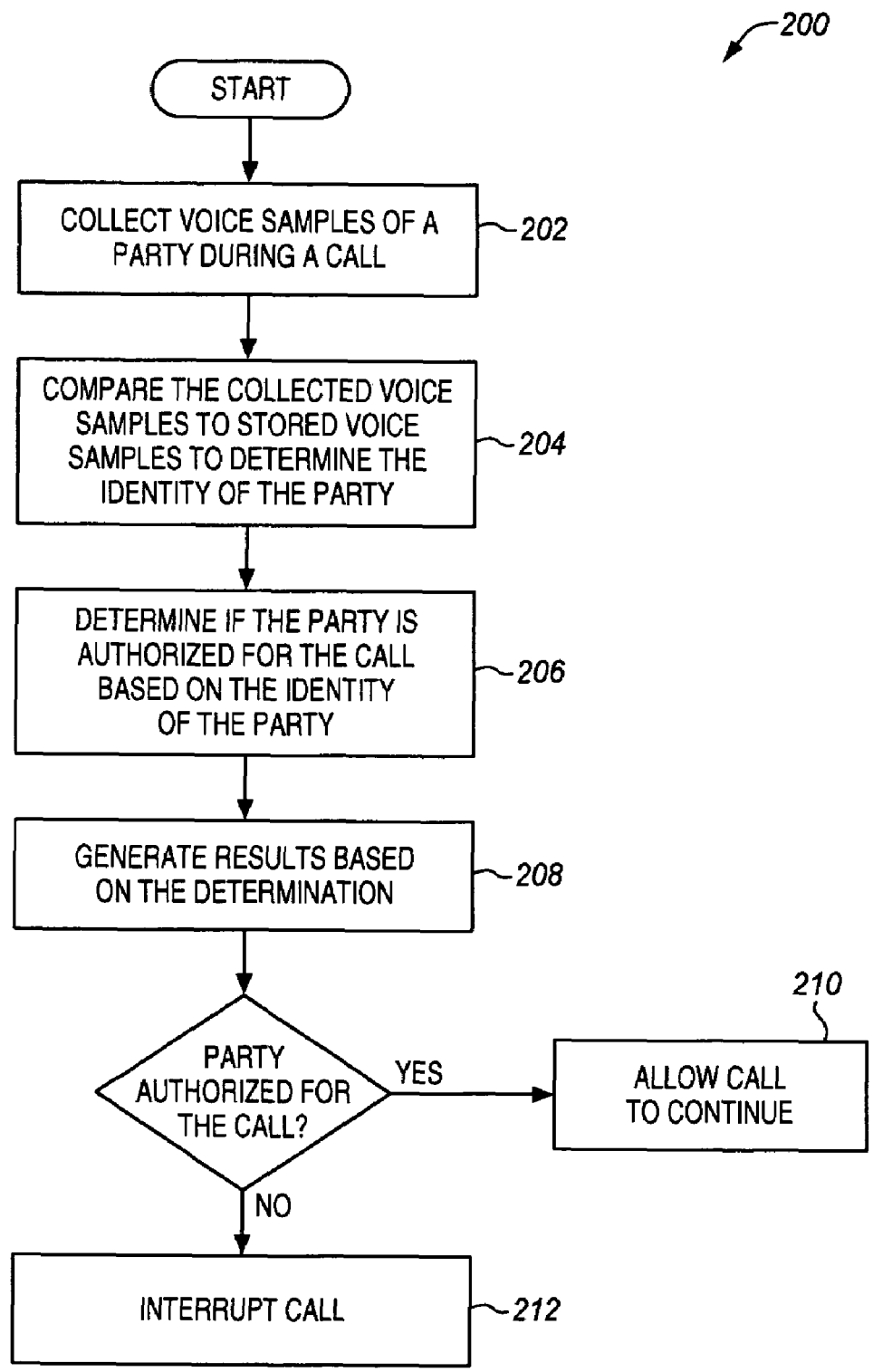
FIG. 2 is a flow chart illustrating a method of operating the communication network of FIG. 1 in an exemplary embodiment of the invention.

FIG. 2 is a flow chart illustrating a method 200 of operating communication network 100 in an exemplary embodiment of the invention. The steps of the flow chart in FIG. 2 are not all inclusive and may include other steps not shown. Also, not all of the steps are necessary, but may be used as desired or preferred.

For the description of method 200, assume that an active call has been established between party 102 and party 103 in FIG. 1. If an active call is established, then spoken conversation in the form of bearer communications are being exchanged between the parties 102-103. Call control function 110 is monitoring and maintaining the call.

In step 202 of method 200, voice collection system 112 collects voice samples of one of the parties 102-103 (assume party 102 in this embodiment) during the call. Voice collection system 112 then transmits the collected voice samples to voice authentication system 114. Voice samples are defined herein as any voice pattern, voice characteristic, or voice print. Voice collection system 112 may work in conjunction with call control function 110 to collect the voice samples or may work with another function or system to collect the voice samples. In this embodiment, voice collection system 112 collects the voice samples passively during the call. In other words, voice collection system 112 copies a portion of the spoken conversation of party 102 to collect the voice samples. The voice samples are collected without party 102 being aware of the collection. In other embodiments, voice collection system 112 or another system may instruct party 102 to provide voice samples to be collected.

In step 204, voice authentication system 114 compares the collected voice samples to stored voice samples to determine the identity of party 102. Voice authentication system 114 has previously stored voice samples for party 102 and other parties. The identity may be a name of party 102 or some other type of identifier. Voice authentication system 114 may also generate an indication as to the level of confidence of the identity of party 102. For instance, the level of confidence may be a percentage or another type of weighted value. Voice authentication system 114 then transmits the identity of party 102 to permission system 116.

In step 206, permission system 116 determines whether party 102 is authorized for the call based on the identity of party 102. To be authorized for a call means that the caller is authorized to place a call to a particular telephone number or numbers, the caller is authorized to place a certain type of call, such as long distance or international calls, the caller is authorized to place a call from a particular call station, etc. The authorization of a caller is based on permissions stored in permission system 116 for the caller. Permissions are privileges granted to a party with respect to what data or services that party is allowed to use.

In this embodiment, permission system 116 has previously stored the permissions for party 102 or for the telephone number used by party 102. In addition to receiving the identity of party 102, permission system 116 may receive the originating telephone number for the call and/or the destination telephone number for the call. In making the determination whether party 102 is authorized for the call, permission system 116 may process the identity of party 102, the destination telephone number of the call, and stored permissions for party 102. For instance, one permission for party 102 may be access to long distance service. Permission system 116 would determine whether the destination number is a long distance number, and then determine whether party 102 is authorized for long distance service. Another permission for party 102 may be access to 900 numbers. Permission system 116 would determine whether the destination number is a 900 number and then determine whether party 102 is authorized to call 900 numbers.

In step 208, permission system 116 generates results based on the determination. The results indicate if party 102 is authorized for the call. Permission system 116 then transmits the results to call control function 110.

Call control function 110 processes the results. If party 102 is authorized for the call, then call control function 110 allows the call to continue in step 210. If party 102 is not authorized for the call, then call control function 110 interrupts the call in step 212. Interrupting the call may mean initiating call tear down, redirecting the call, or any other type of interrupt.

Method 200 may be performed immediately after the call is established and conversation has begun between party 102 and party 103 to verify that party 102 is authorized for the call. By performing method 200 immediately, an unauthorized party can be identified early in the call and the call can be interrupted.

Method 200 may also be periodically performed to ensure that an authorized party remains on the call. For instance, party 102 may initiate the call and begin a conversation with party 103. At some time during the call, party 102 may turn the conversation over to another party that is not authorized for the call. If method 200 is periodically run, method 200 would determine that the other party is not authorized for the call and would interrupt the call.

Method 200 may also be performed responsive to a control signal from a source. For instance, if a party is suspected of making unauthorized calls, method 200 can be performed upon request to stop the unauthorized use.

Along with interrupting the call, call control function 110 may perform other functions. Call control function 110 may play an announcement to party 102 and/or party 103 indicating that the call is being interrupted and possibly a reason why the call is being interrupted. Call control function 110 may generate a call record indicating that the call was unauthorized and indicating the identity of party 102 making the unauthorized call. Call control function 110 may then transmit the call record to billing system 118. Billing system 118 receives the call record and generates a bill based on the call record indicating that an unauthorized call was made and indicating the identity of party 102 making the unauthorized call. Thus, a record is made of unauthorized calls and the culprits of such calls.

Communication network 100 advantageously provides for a secure way of identifying party 102 to effectively implement call restriction and call barring. Communication network 100 collects the voice samples of party 102 in a passive manner so that party 102 is unaware that voice authentication is taking place. Party 102 is therefore not bothered with a prompt from communication network 100 to speak a particular word or phrase. Communication network 100 also allows records to be generated that indicate if party 102 has made unauthorized calls.

FIGS. 3-10 illustrate examples of operating communication network 100 in exemplary embodiments of the invention.

Example 1

Figure 3:
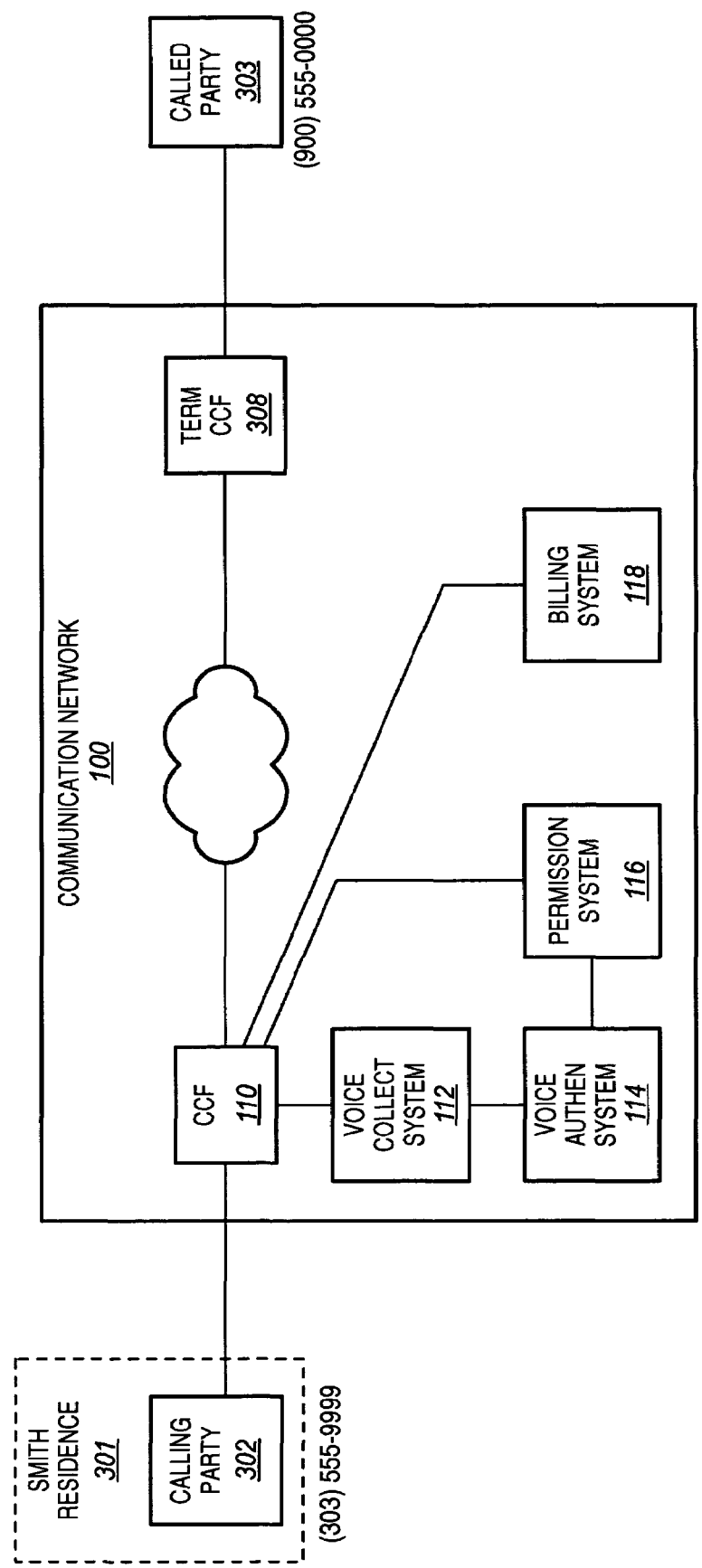
FIG. 3 illustrates another embodiment of the communication network.

In this example, voice authentication is used for call control in communication network 100 to restrict calls. FIG. 3 illustrates communication network 100 connecting a call between a calling party 302 and a called party 303. Calling party 302 is at the Smith residence 301 and may be Dad, Mom, or Junior. Calling party 302 has the telephone number of (303) 555-9999. Called party 303 has the telephone number of (900) 555-0000.

As in FIG. 1, communication network 100 includes call control function (CCF) 110, voice collection system 112, voice authentication system 114, permission system 116, and billing system 118. Call control function 110 in this embodiment is an originating call control function 110 for the call, such as a call control function in an originating switch, in an originating Mobile Switching Center (MSC), or in some other originating node for communication network 100. Communication network 100 further includes a terminating call control function 308. Communication network 100 may include other networks, systems, or devices not shown in FIG. 3.

Figure 4:
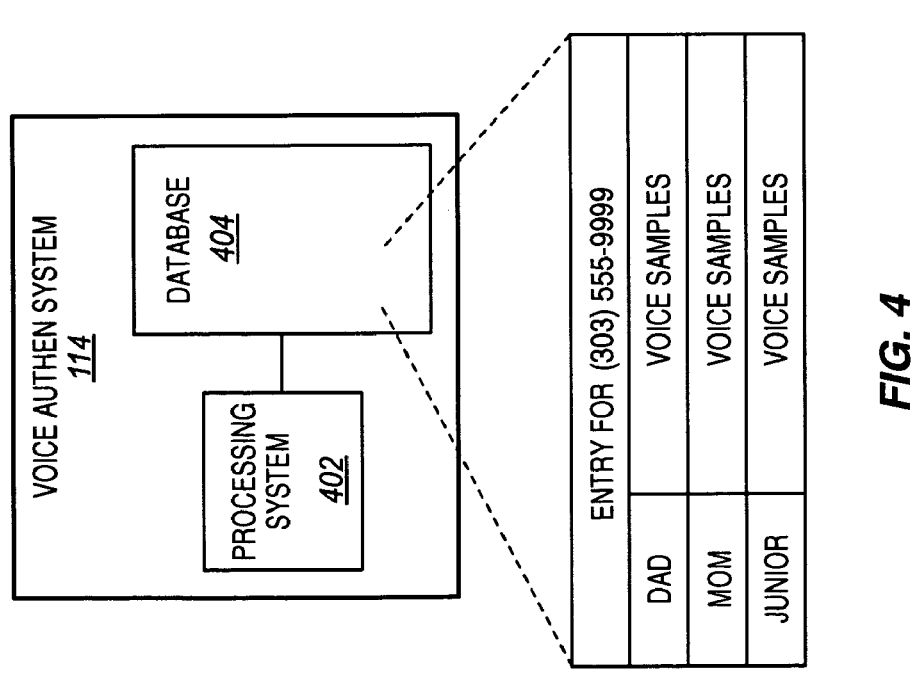
FIG. 4 illustrates a voice authentication system for the embodiment of FIG. 3.

FIG. 4 illustrates one embodiment of voice authentication system 114. Voice authentication system 114 comprises a processing system 402 coupled to a database 404. Processing system 402 may be comprised of a single processor or multiple parallel processors. Database 404 may be resident on a single computer or server, or may be distributed among multiple computers or servers in communication network 100. Database 404 is pre-programmed with and stores voice samples for multiple users. One of the entries in database 404 is an entry for the voice samples (or voice prints) associated with the telephone number (303) 555-9999, which is the number for the Smith residence 301. There is a voice sample for each of Dad, Mom, and Junior that were pre-recorded at some point.

Figure 5:
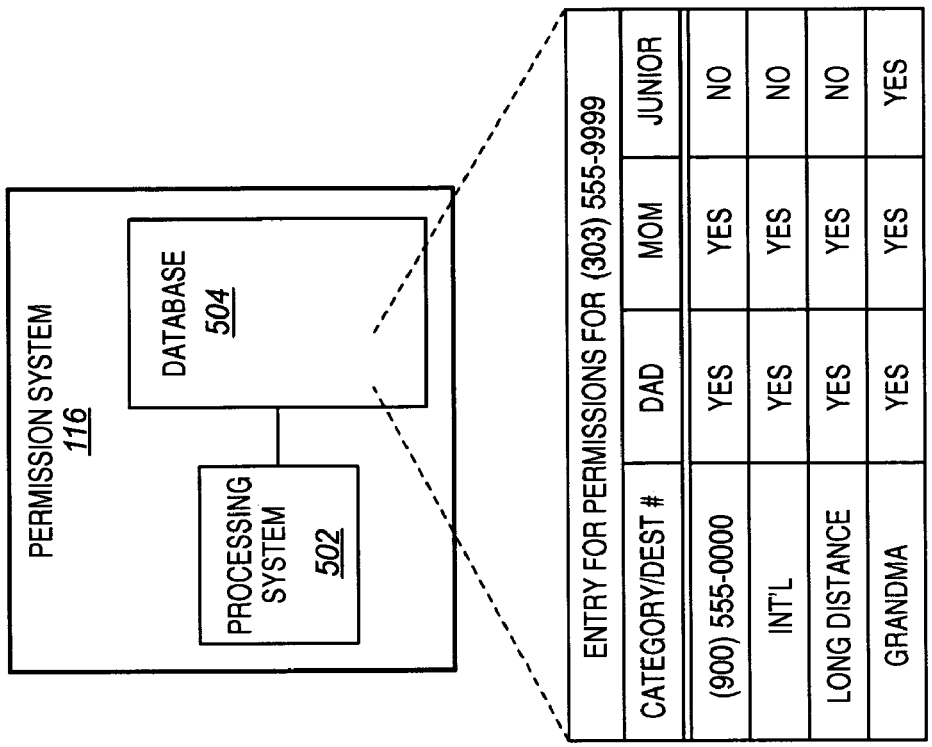
FIG. 5 illustrates a permission system for the embodiment of FIG. 3.

FIG. 5 illustrates one embodiment of permission system 116. Permission system 116 comprises a processing system 502 and a database 504. Processing system 502 and database 504 could be the same processing system 402 and database 404 as in voice authentication system 114, or they may be separate systems. Database 504 is pre-programmed with and stores permissions for multiple users. One of the entries in database 504 is an entry for the permissions associated with the telephone number (303) 555-9999, which is the number for the Smith residence 301. There are permissions defined for each of Dad, Mom, and Junior. Permissions may be based on categories or types of calls, destination telephone numbers, or any other information. For instance, one permission is for telephone number (900) 555-0000, where Dad and Mom are authorized to place calls and Junior is not. Another permission is for the category of international calls, where Dad and Mom are authorized to place calls and Junior is not. Another permission is for the category of long distance calls, where Dad and Mom are authorized to place calls and Junior is not. Another permission is the telephone number for Grandma, where Dad, Mom, and Junior are authorized to place calls. This entry for telephone number (303) 555-9999 may include many other permissions not shown in FIG. 5.

When in operation in FIG. 3, calling party 302 dials the number for called party 303. The call is established between calling party 302 and called party 303 over communication network 100 through originating call control function 110 and terminating call control function 308. With the call established, spoken words in the form of bearer communications are being exchanged between the parties 302-303. Voice collection system 112 passively collects voice samples of calling party 302 during the call. Voice collection system 112 transmits the collected voice samples to voice authentication system 114.

Processing system 402 in voice authentication system 114 receives the collected voice samples (see FIG. 4). Processing system 402 also receives the telephone number of calling party 302, which is (303) 555-9999. Processing system 402 looks up the entry for the telephone number of calling party 302 in database 404. The entry for the telephone number of calling party 302 includes voice samples for each of Dad, Mom, and Junior. Processing system 402 compares the collected voice samples from the call to the voice samples of Dad, Mom, and Junior stored in database 404 to determine the identity of calling party 302. Processing system 402 then transmits the identity of calling party 302 to permission system 116.

Processing system 502 in permission system 116 receives the identity of calling party 302 (see FIG. 5). Processing system 502 also receives the telephone number dialed by calling party 302, which is (900) 555-0000, and the telephone number of calling party 302, which is (303) 555-9999. Processing system 502 looks up the entry for the permissions for the telephone number of calling party 302 in database 504. Based on the identity of calling party 302 and the telephone number dialed by calling party 302, processing system 502 determines whether calling party 302 is authorized for the call. For instance, if calling party 302 is identified as Junior, then processing system 502 would determine that calling party 302 is not authorized for the current call to (900) 555-0000. If calling party 302 is identified as Dad or Mom, then processing system 502 would determine that calling party 302 is authorized for the current call. Processing system 502 generates results indicating whether calling party 302 is authorized for the call. Processing system 502 then transmits the results to call control function 110.

Call control function 110 processes the results. If calling party 302 is authorized for the call, then call control function 110 allows the call to continue. If calling party 302 is not authorized for the call, then call control function 110 interrupts the call. Call control function 110 also plays an announcement to calling party 302 and called party 303 indicating that the call is being interrupted. The announcement may also indicate a reason why the call is being interrupted.

Call control function 110 also generates a call record indicating that the call was unauthorized and indicating the identity of calling party 302 making the unauthorized call. Assume that calling party 302 is Junior. Call control function 110 generates a call record indicating, among other things, that an unauthorized call was placed by Junior to (900) 555-0000 and the call was interrupted. Call control function 110 then transmits the call record to billing system 118. Billing system 118 receives the call record and generates a bill indicating, among other things, that an unauthorized call was placed by Junior to (900) 555-0000. The people at the Smith residence 301 may then see in their bill who has made unauthorized calls.

Example 2

Figure 6:
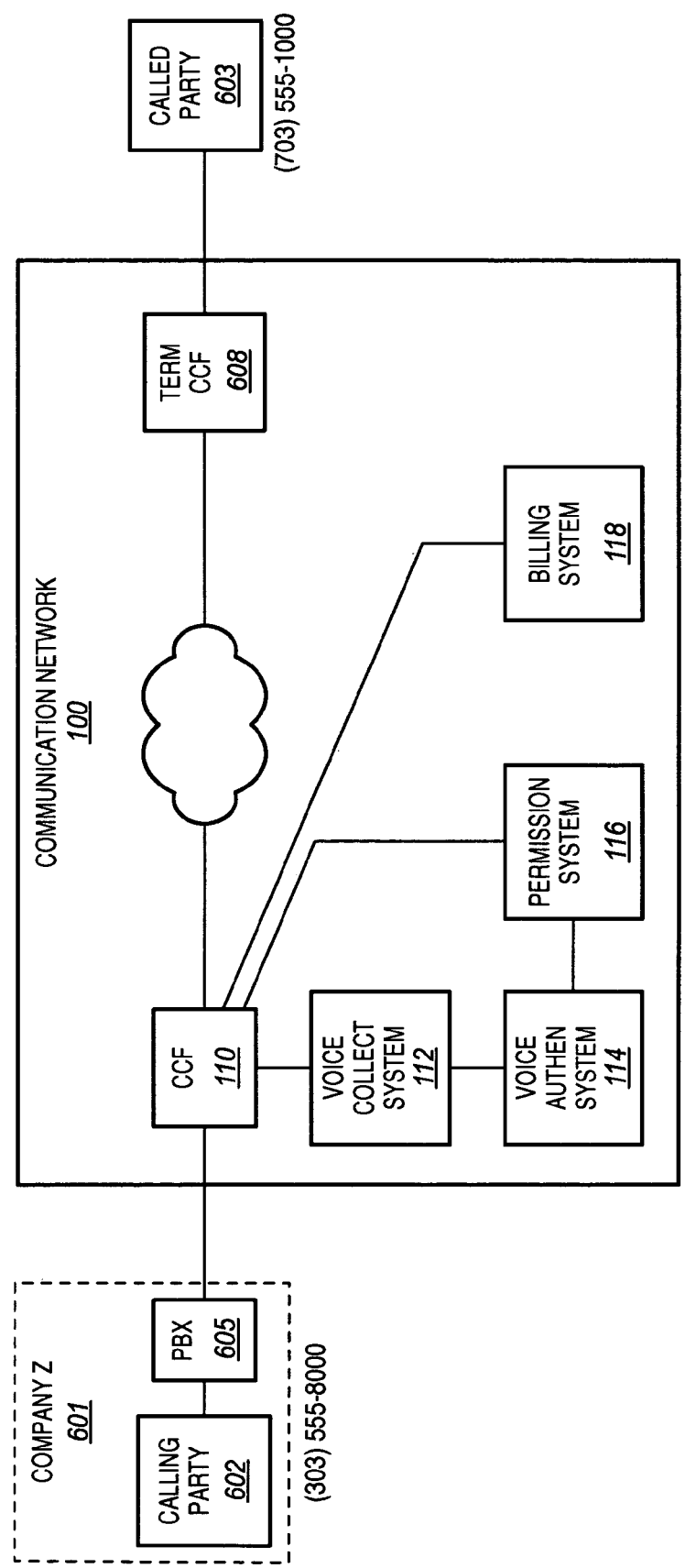
FIG. 6 illustrates another embodiment of the communication network.

In this example, voice authentication is used for call control in communication network 100 to restrict calls. FIG. 6 illustrates communication network 100 connecting a call between a calling party 602 (through PBX 605) and a called party 603. Calling party 602 is at Company Z 601 and may comprise an engineer, an attorney, an accountant, or any other employee of Company Z 601. Calling party 602 has placed the call from telephone number of (303) 555-8000 inside Company Z 601. Company Z 601 may have many other telephone numbers such as (303) 555-8000 through (303) 555-8009. Called party 603 has the telephone number of (703) 555-1000.

As in FIG. 1, communication network 100 includes call control function (CCF) 110, voice collection system 112, voice authentication system 114, permission system 116, and billing system 118. Call control function 110 in this embodiment is an originating call control function 110 for the call, such as a call control function in an originating switch, in an originating MSC, or in some other originating node for communication network 100. Communication network 100 further comprises a terminating call control function 608. Communication network 100 may include other networks, systems, or devices not shown in FIG. 6.

Figure 7:
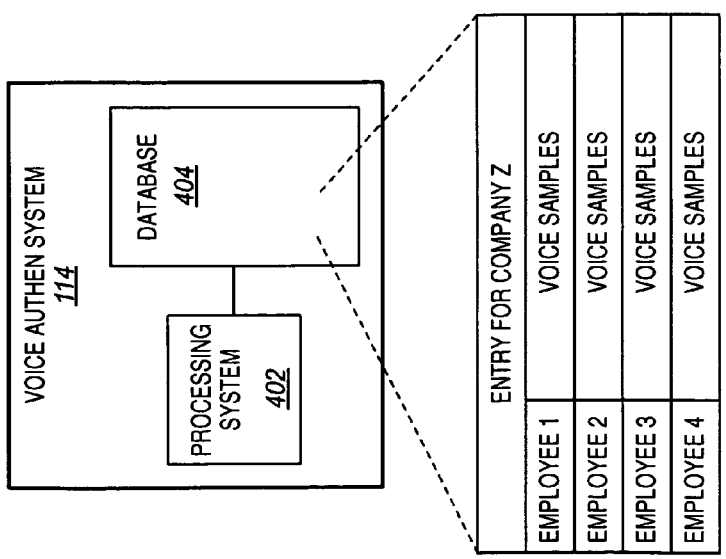
FIG. 7 illustrates a voice authentication system for the embodiment of FIG. 6.

Voice authentication system 114, as shown in FIG. 7, has a similar configuration as shown in FIG. 4. Voice authentication system 114 includes processing system 402 and database 404. Database 404 is pre-programmed with and stores voice samples for employees of Company Z 601. The voice samples for the employees for Company Z 601 were pre-recorded at some point.

Figure 8:
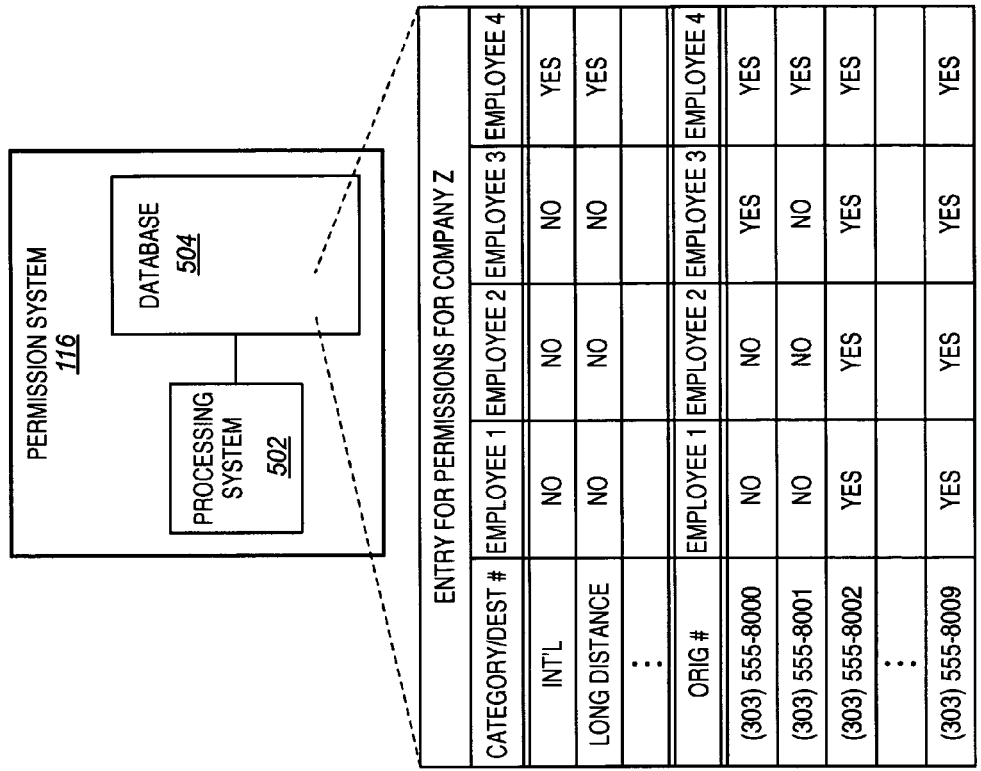
FIG. 8 illustrates a permission system for the embodiment of FIG. 6.

Permission system 116, as shown in FIG. 8, has a similar configuration as shown in FIG. 5. Permission system 116 comprises processing system 502 and database 504. One of the entries in database 504 is an entry for the permissions associated with the employees of Company Z 601. There are permissions defined for each employee. For instance, one permission is for the category of international calls. Another permission is for the category of long distance calls. Another permission is for telephone numbers from which certain employees may not make calls (such as unsecure locations).

When in operation in FIG. 6, calling party 602 dials the number for called party 603. The call is established between calling party 602 and called party 603 over communication network 100 through originating call control function 110 and terminating call control function 608. With the call established, spoken words in the form of bearer communications are being exchanged between the parties 602-603. Voice collection system 112 passively collects voice samples of calling party 602 during the call. Voice collection system 112 then transmits the collected voice samples to voice authentication system 114.

Processing system 402 in voice authentication system 114 receives the collected voice samples (see FIG. 7). Processing system 402 also receives the telephone number of calling party 602, which is (303) 555-8000. Processing system 402 looks up the entry for the telephone number of calling party 602 in database 404. The entry for the telephone number of calling party 602 includes voice samples for each of the employees of Company Z 601. Processing system 402 compares the collected voice samples from the call to the voice samples of the employees stored in database 404 to determine the identity of calling party 602. Processing system 402 then transmits the identity of calling party 602 to permission system 116.

Processing system 502 in permission system 116 receives the identity of calling party 302 (see FIG. 8). Processing system 502 also receives the telephone number dialed by calling party 602, which is (703) 555-1000, and the telephone number of calling party 602, which is (303) 555-8000. Processing system 502 looks up the entry for the permissions for the telephone number of calling party 602 in database 504. Based on the identity of calling party 602 and the telephone number dialed by calling party 602, processing system 502 determines whether calling party 602 is authorized for the call. In this instance, the determination is whether calling party 602 is authorized to place the call to this particular destination. For instance, if calling party 602 is identified as Employee 1 and the telephone number called was a long distance call, then processing system 502 would determine that calling party 602 is not authorized for the current call. If calling party 602 is identified as Employee 4 and the telephone number called was a long distance call, then processing system 502 would determine that calling party 602 is authorized for the current call.

Processing system 502 also determines whether calling party 602, as identified above, is authorized to place the call from a particular call station or particular telephone number in Company Z 601. Calling party 602 called from a call station having the telephone number (303) 555-8000. Therefore, processing system 502 determines whether calling party 602 is authorized to place a call from (303) 555-8000. If calling party 602 is identified as Employee 2, then processing system 502 would determine that calling party 602 is not authorized to place a call from this call station. If calling party 602 is identified as Employee 3, then processing system 502 would determine that calling party 602 is authorized to place a call from this call station.

Processing system 502 generates results based on the above determinations whether calling party 602 is authorized for the call. Processing system 502 transmits the results to call control function 110.

Call control function 110 processes the results. If calling party 602 is authorized for the call, then call control function 110 allows the call to continue. If calling party 602 is not authorized for the call, then call control function 110 interrupts the call. Call control function 110 also plays an announcement to calling party 602 and called party 604 indicating that the call is being interrupted. The announcement may also indicate a reason why the call is being interrupted.

Call control function 110 also generates a call record for the call. If the call was interrupted, then the call record indicates that the call was unauthorized and indicates the identity of calling party 602 making the unauthorized call. If the call was not interrupted, then the call record indicates the identity of calling party 602 to allow for tracking of calls within Company Z 601. Call control function 110 then transmits the call record to billing system 118. Billing system 118 receives the call record and generates a bill. The bill will indicate which employees made what calls from what call stations. The bill will also indicate if an employee has made unauthorized calls.

Example 3

Figure 9:
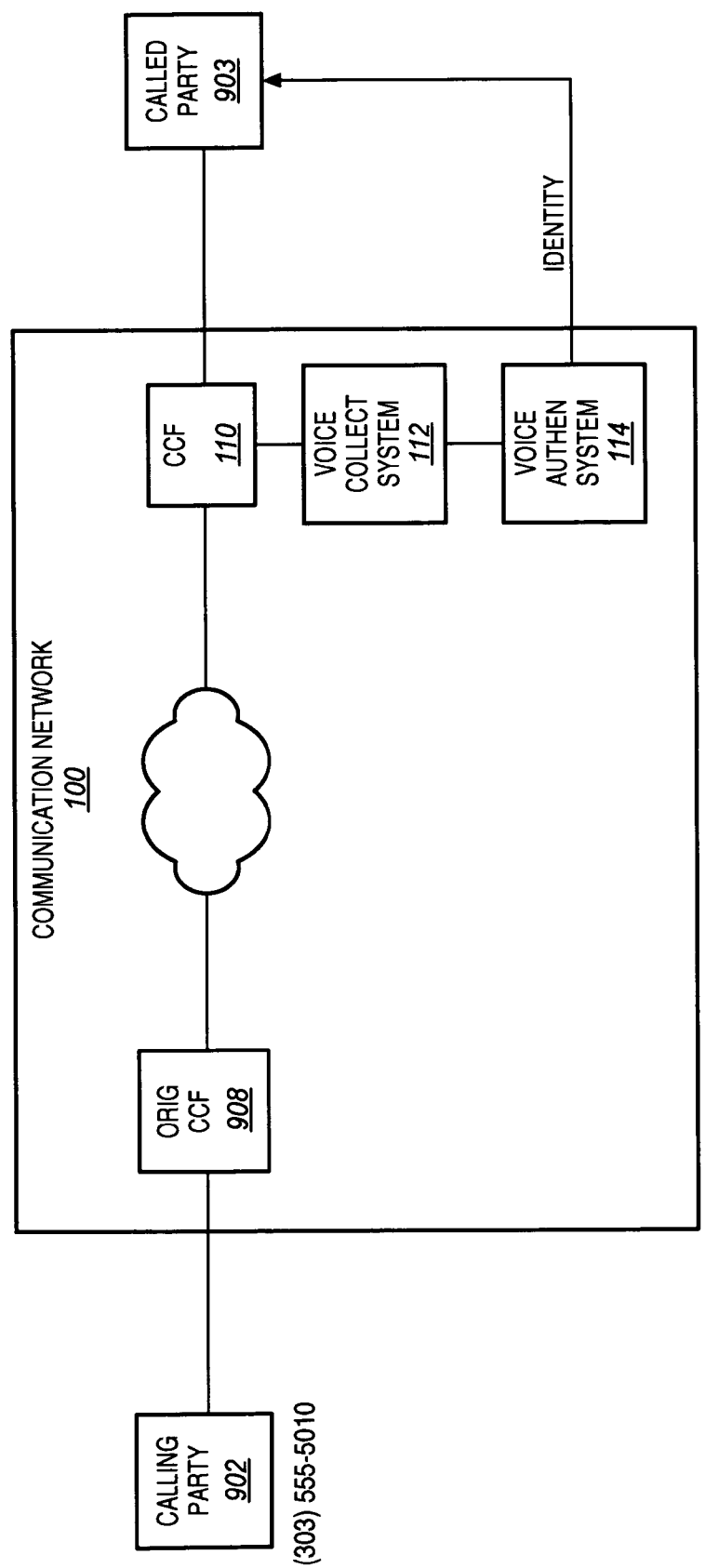
FIG. 9 illustrates another embodiment of the communication network.

In this example, voice authentication is used to verify the identity of a calling party to a called party. FIG. 9 illustrates communication network 100 connecting a call between a calling party 902 and a called party 903. As in FIG. 1, communication network 100 includes call control function (CCF) 110, voice collection system 112, and voice authentication system 114. Call control function 110 in this embodiment is a terminating call control function 110 for the call, such as a call control function in a terminating switch, in a terminating MSC, or in some other terminating node for communication network 100. Communication network 100 further comprises an originating call control function 908. Communication network 100 may include other networks, systems, or devices not shown in FIG. 9.

Figure 10:
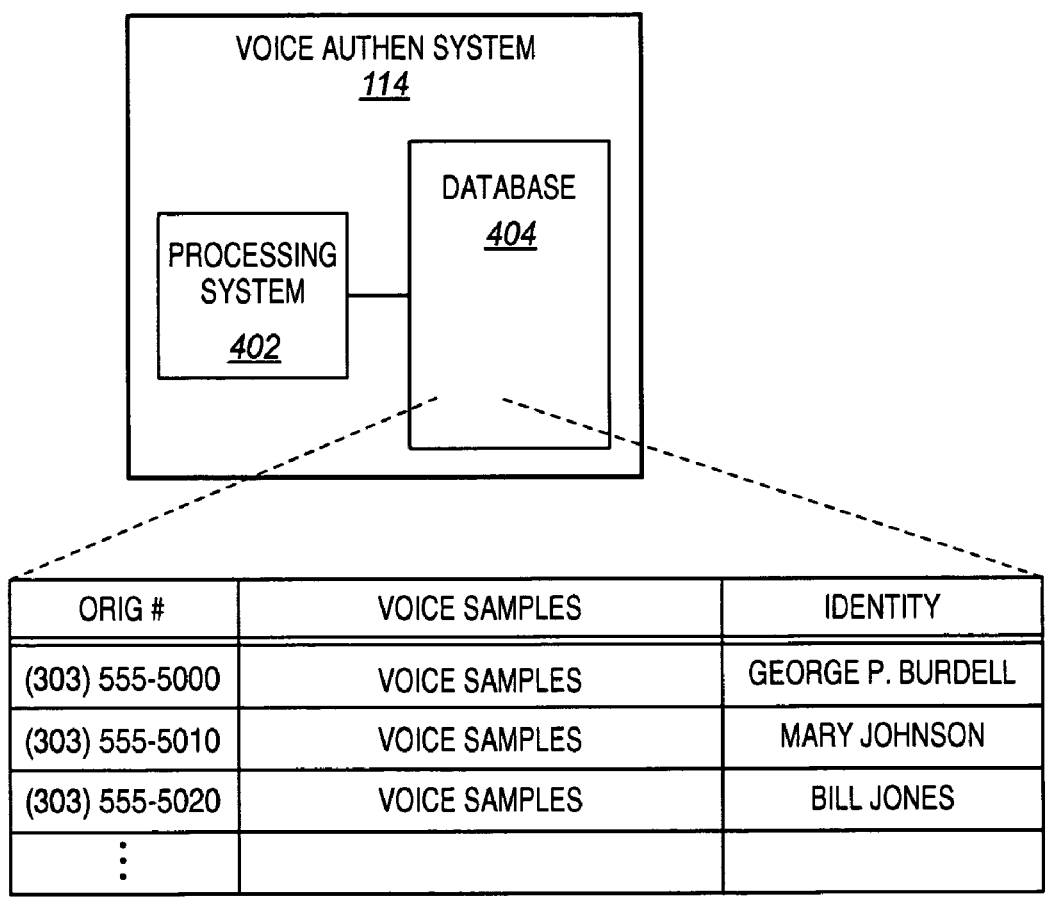
FIG. 10 illustrates a voice authentication system for the embodiment of FIG. 9.

Voice authentication system 114, as shown in FIG. 10, has a similar configuration as shown in FIGS. 4 and 7. Voice authentication system 114 includes processing system 402 and database 404. Database 404 is pre-programmed with and stores voice samples for multiple callers that were pre-recorded at some point. For instance, one entry is for George P. Burdell who has previously stored voice samples and his telephone number (303) 555-5000. Another entry is for Mary Johnson who has previously stored voice samples and her telephone number (303) 555-5010. Another entry is for Bill Jones who has previously stored voice samples and his telephone number (303) 555-5020.

When in operation in FIG. 9, calling party 902 dials the number for called party 903. The call is established between calling party 902 and called party 903 over communication network 100 through originating call control function 908 and terminating call control function 110. With the call established, spoken words in the form of bearer communications are being exchanged between the parties 902-903. Voice collection system 112 passively collects voice samples of calling party 902 during the call. Voice collection system 112 then transmits the collected voice samples to voice authentication system 114.

Processing system 402 in voice authentication system 114 receives the collected voice samples (see FIG. 10). Processing system 402 also receives the telephone number of calling party 902 from voice authentication system 114. Processing system 402 looks up the entry for the telephone number of calling party 602 in database 404. The entry for the telephone number of calling party 902 includes voice samples for calling party 902. Processing system 402 then compares the collected voice samples from the call to the voice samples stored in database 404 to determine the identity of calling party 902. Processing system 402 may also generate an indication as to the level of confidence of the identity of calling party 902. For instance, the level of confidence may be a percentage or another type of weighted value. Processing system 402 then transmits the identity of calling party 902, and possibly the level of confidence, to called party 903. Called party 903 may then authenticate the identity of the calling party 902 based on the information provided by voice authentication system 114.

We claim:

1. A communication network connecting an active call between a first party and a second party, the communication network comprising:
   a voice collection system that collects voice samples of the first party during the call;
   a voice authentication system that receives the collected voice samples from the voice collection system, and compares the collected voice samples to stored voice samples to determine the identity of the first party;
   a permission system that stores permissions for the first party indicating services that the first party is allowed to use, receives the identity of the first party from the voice authentication system, determines if the first party is authorized for the call based on the identity of the first party and the stored permissions, and generates results based on the determination;
   a call control function for the call that receives the results from the permission system, interrupts the call responsive to the results indicating that the first party was not authorized for the call, and generates a call record for a billing system indicating that the call was unauthorized and indicating the identity of the first party responsive to the results indicating that the first party was not authorized for the call; and
   the billing system that receives the call record from the call control function, and generates a bill based on the call record indicating that the call was unauthorized and indicating the identity of the first party.

2. The communication network of claim 1 wherein the call control function interrupts the call by initiating call tear down.

3. The communication network of claim 1 wherein the call control function interrupts the call by redirecting the call.

4. The communication network of claim 1 wherein the call control function allows the call to continue responsive to the results indicating that the first party was authorized for the call.

5. The communication network of claim 1 wherein the voice collection system passively collects the voice samples of the first party during the call without prompting the first party.

6. The communication network of claim 1 wherein the call control function plays an announcement to at least one of the first party and the second party responsive to interrupting the call.

7. The communication network of claim 1 wherein the voice authentication system further transmits the identity of the first party to the second party during the call.

8. A method of operating a communication network connecting an active call between a first party and a second party, the method comprising:
   collecting voice samples of the first party during the call;
   comparing the collected voice samples to stored voice samples to determine the identity of the first party;
   storing permissions for the first party indicating services that the first party is allowed to use;
   determining if the first party is authorized for the call based on the identity of the first party and the stored permissions;
   interrupting the call responsive to a determination that the first party was not authorized for the call;
   generating a call record for a billing system indicating that the call was unauthorized and indicating the identity of the first party responsive to a determination that the first party was not authorized for the call; and
   generating a bill in the billing system based on the call record indicating that the call was unauthorized and indicating the identity of the first party.

9. The method of claim 8 wherein interrupting the call comprises initiating call tear down.

10. The method of claim 8 wherein interrupting the call comprises redirecting the call.

11. The method of claim 8 further comprising:
    allowing the call to continue responsive to a determination that the first party was authorized for the call.

12. The method of claim 8 wherein collecting voice samples of the first party during the call comprises:
    passively collecting the voice samples of the first party during the call without prompting the first party.

13. The method of claim 8 further comprising:
    playing an announcement to at least one of the first party and the second party responsive to interrupting the call.

14. The method of claim 8 further comprising:
    transmitting the identity of the first party to the second party during the call.

15. A communication network, comprising:
    an originating call control function connecting a call to a calling party;
    a terminating call control function connecting the call to a called party;
    a voice collection system that passively collects voice samples of the calling party during the call;
    a voice authentication system that receives the collected voice samples from the voice collection system, and compares the collected voice samples to stored voice samples to determine the identity of the calling party; and
    a permission system that stores permissions for the calling party indicating services that the calling party is allowed to use, receives the identity of the calling party from the voice authentication system, determines if the calling party is authorized for the call based on the identity of the calling party and the stored permissions, and generates results based on the determination;
    wherein the originating call control function receives the results from the permission system, interrupts the call responsive to the results indicating that the calling party was not authorized for the call, generates a call record for a billing system indicating that the call was unauthorized and indicating the identity of the calling party responsive to the results indicating that the calling party was not authorized for the call, and allows the call to continue responsive to the results indicating that the calling party was authorized for the call;
    wherein the billing system receives the call record from the originating call control function, and generates a bill based on the call record indicating that the call was unauthorized and indicating the identity of the calling party.

16. The communication network of claim 15 wherein the voice authentication system further transmits the identity of the calling party to the called party during the call, and transmits a level of confidence of the identity of the calling party.

* * * * *

UNITED STATES PATENT AND TRADEMARK OFFICE
CERTIFICATE OF CORRECTION

| | | |
|---|---|---|
| PATENT NO. | : 7,636,425 B2 | Page 1 of 1 |
| APPLICATION NO. | : 11/132043 | |
| DATED | : December 22, 2009 | |
| INVENTOR(S) | : Chambers | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1039 days.

In column 2, line 16, the text "tom down" should read "torn down".

Signed and Sealed this

Twenty-third Day of November, 2010

David J. Kappos
*Director of the United States Patent and Trademark Office*